US006170761B1

(12) United States Patent
Maul et al.

(10) Patent No.: US 6,170,761 B1
(45) Date of Patent: *Jan. 9, 2001

(54) METHOD AND DEVICE FOR THE CONTINUOUS MIXING OF A DROPLET DISPERSION WITH A LIQUID

(75) Inventors: Christine Maul, Köln; Matthias Stenger, Monheim; Jörg Tofahrn, Leverkusen; Michael Van Teeffelen, Velbert, all of (DE)

(73) Assignee: Bayer Aktiengesselschaft, Leverkusen (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/361,850

(22) Filed: Jul. 27, 1999

Related U.S. Application Data

(63) Continuation of application No. 09/148,021, filed on Sep. 3, 1998.

(30) Foreign Application Priority Data

Sep. 5, 1997 (DE) ..................... 197 38 870

(51) Int. Cl.[7] ..................... B01J 13/04
(52) U.S. Cl. ..................... 239/433; 239/430
(58) Field of Search ..................... 239/430, 433

(56) References Cited

U.S. PATENT DOCUMENTS

| | | | | |
|---|---|---|---|---|
| 3,234,307 | | 2/1966 | Tuttle | 264/4.3 |
| 3,242,051 | | 3/1966 | Hiestand et al. | 264/4.3 |
| 3,419,082 | * | 12/1968 | O'Regan et al. | 239/433 |
| 4,411,389 | | 10/1983 | Harrison | 239/430 |
| 4,545,157 | * | 10/1985 | Saurwein | 239/433 |
| 4,637,905 | | 1/1987 | Gardner | 264/4.3 |
| 4,738,614 | * | 4/1988 | Snyder et al. | 239/433 |
| 5,126,381 | | 6/1992 | Liscomb | 264/4.3 |
| 5,173,007 | | 12/1992 | Krajieck | 405/59 |
| 5,645,223 | * | 7/1997 | Hull et al. | 239/433 |
| 5,792,472 | | 8/1998 | Roux et al. | 424/450 |

FOREIGN PATENT DOCUMENTS

| | | | | |
|---|---|---|---|---|
| 1240756 | | 7/1971 | (CH) . | |
| 4421352C2 | | 3/1997 | (DE) . | |
| 74678 | * | 3/1983 | (EP) | 239/433 |
| 27086 | * | 11/1896 | (GB) | 239/430 |
| 73202 | * | 6/1977 | (JP) | 239/430 |
| 190878 | * | 8/1964 | (SE) | 239/433 |

OTHER PUBLICATIONS

Communication from German Patent Office dated Apr. 23, 1999, with Abstract of cited German patent.

* cited by examiner

*Primary Examiner*—Charles R. Eloshway
(74) *Attorney, Agent, or Firm*—Brinks Hofer Gilson & Lione

(57) ABSTRACT

A method and a device for gentle continuous mixing of a droplet dispersion with a liquid are described, wherein the liquid is injected into the droplet dispersion in the form of a plurality of fine liquid jets, such that the kinetic energy of the liquid jets is dissipated at a short distance from the injection point and further mixing is effected by circulating flow generated in the vessel and exhibiting shear rates of less than 20/s.

15 Claims, 2 Drawing Sheets

METHOD AND DEVICE FOR THE CONTINUOUS MIXING OF A DROPLET DISPERSION WITH A LIQUID

This application is a continuation of application Ser. No. 09/148,021, filed Sep. 3, 1998, (pending).

BACKGROUND OF THE INVENTION

In many industrial processes for producing fine-particle spherical polymers or microcapsules, a droplet dispersion or cores of fine-particle, liquid or solid material surrounded by a liquid sheath is first formed. Thereafter, the droplets or the liquid sheath enclosing the particles is hardened or stabilised by adding a further liquid, e.g. a hardener or an acid or base which changes the pH value of the dispersion.

These processes are problematic because it is difficult to mix the liquid into the droplet dispersion gently enough to avoid agglomeration and coalescence of the droplets and thus to avoid disturbance of the droplet size distribution.

In the case of the widely used method of micro-encapsulation by coacervation or complex coacervation, for example, a droplet dispersion is produced in an aqueous gelatine solution or an aqueous solution of gelatine and gum arabic at a substantially neutral pH value, and the droplets are coated with a gelatine layer. Encapsulation is effected by the simultaneous addition of a copolymer and an aqueous solution of an inorganic acid, optionally followed by a reduction in the temperature of the dispersion. The capsules obtained in this way are so stable that they may be washed and optionally hardened through the addition of formalin and a simultaneous increase in the pH value. However, before acidification, the suspension of gelatine-coated droplets is very sensitive to mechanical loading, necessitating the gelatine-coated droplets to be very gently mixed with the acid solution.

SUMMARY OF THE INVENTION

The object of the present invention is to provide a method and a device for the continuous mixing of a droplet dispersion with a liquid in a gentle manner, i.e. under as low as possible a mechanical load.

This object is achieved according to the invention by injecting a liquid into the droplet dispersion via a plurality of fine liquid jets, wherein the energy of the liquid jets is dissipated at a short distance downstream of the injection point, and further mixing is effected by a circulating flow generated in the vessel and exhibiting shear rates of less than 20/s.

DESCRIPTION OF THE DRAWINGS

The invention is described in more detail below with the aid of the attached Figures.

DESCRIPTION OF THE INVENTION

Figure 1:
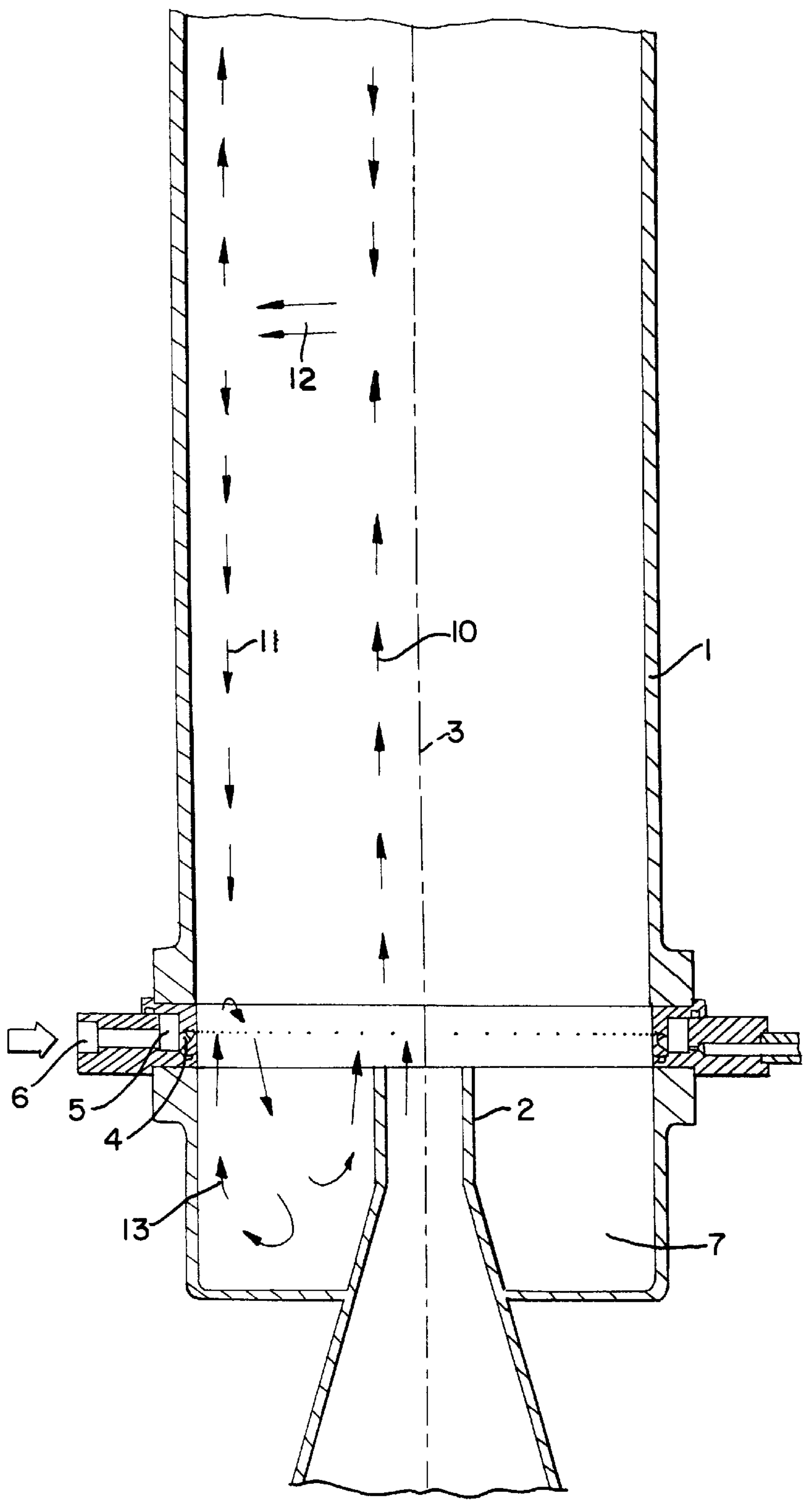
FIG. 1 shows a device according to the invention for the continuous mixing of a droplet dispersion with a liquid.

The method of the present invention comprises injecting a liquid into the droplet dispersion via a plurality of fine liquid jets, wherein the energy of the liquid jets is dissipated at a short distance downstream of the injection point, and further mixing is effected by a circulating flow generated in the vessel and exhibiting shear rates of less than 20/s.

In order to stimulate the circulating flow, the droplet dispersion is preferably introduced axially into a cylindrical vessel, wherein the inlet speed of the droplet dispersion is 15 to 100 times greater than the average speed ("through-flow speed") established on the basis of the throughput through the cylindrical vessel. In this way, an axial forward flow and a peripheral backward flow are generated in the cylindrical vessel with corresponding flow reversal at a distance from the inlet point for the droplet dispersion, through which the droplets pass repeatedly. The through-flow speed through the cylindrical vessel may range from 0.1 to 0.5 cm/s. The droplet dispersion is accordingly introduced into the cylindrical vessel at a speed of from 3 to 15 cm/s. The droplet dispersion generally consists of liquid droplets dispersed in a liquid, where the liquid forming the droplets is immiscible in the liquid forming the continuous phase.

The inlet point for the droplet dispersion preferably projects axially into the cylindrical vessel, such that the cylindrical vessel comprises an annular space to the rear of the inlet point, in which annular space the back flow is deflected to become forward flow. The cross-sectional area of the axial inlet pipe preferably is from about 1/12 to about 1/45 of the cross-sectional area of the cylindrical vessel.

The liquid to be mixed into the droplet dispersion is preferably injected into the back flow through the shell of the cylindrical vessel. The cylindrical vessel shell preferably comprises a plurality of nozzles in a plane perpendicular to the vessel axis, the liquid being introduced through these nozzles. The inlet speed for the liquid may typically amount to from about 1 to 5 m/s.

Injection of the liquid jets is preferably effected with a direction component counter to the peripheral back flow of the droplet dispersion, such that the liquid jets generate a peripheral forward flow in the annular space surrounding the inlet point for the droplet dispersion. In this way, a particularly intensive exchange of matter is obtained in the annular space surrounding the inlet point. The momentum component introduced by the liquid jets in parallel with the vessel axis may be approximately of the order of the momentum introduced by the droplet dispersion, in particular approximately 1 to 10 times the moment introduced by the droplet dispersion.

In another preferred embodiment of the invention, if the droplets have a lower specific weight than the continuous phase, then the droplet dispersion is introduced into the cylindrical container from the bottom upwards. In this case, the droplets exhibit an upwards impetus, which depletes the droplet concentration in the annular space surrounding the inlet point for the droplet dispersion. The peripheral upwards flow present in the annular space accordingly exhibits a reduced droplet concentration. This is particularly significant if, for economic reasons, droplet dispersions are used which have very high droplet concentrations of from 40 to 60 vol. %. The liquid is then injected into a droplet dispersion with a greatly reduced droplet concentration, such that the risk of agglomeration of droplets in the injection area is further reduced.

It is accordingly preferred for the direction of flow through the cylindrical vessel to be from top to bottom if the droplets are of a greater density than the continuous phase.

FIG. 1 is a basic representation of a vessel 1 in the form of a cylindrical column with an axially disposed inlet pipe 2 for the droplet dispersion. The droplet dispersion may be produced by methods known per se. For example, the droplet dispersion may be produced by injection of the liquid forming the droplets into an aqueous gelatine solution. A plurality of nozzles 4, with a diameter of about 0.1 to 0.8 and preferably about 0.4 mm for example, are disposed along a line around the circumference of the cylindrical vessel 1 perpendicular to the axis 3 thereof. For example, from about 12 to 120 nozzles may be provided. The nozzles are fed from an annular channel 5, into which the liquid is introduced through one or more supply lines 6. As is shown, the nozzles 4 point obliquely upwards, such that the injected liquid comprises a direction component in the through-flow direction of the vessel 1. The cross-sectional area of the inlet pipe 2 for the droplet dispersion may amount to about 1/12 to 1/45 of the cross-sectional area of the cylindrical vessel 1. The incoming droplet dispersion causes the vessel contents to circulate with an axial forward flow 10 and a peripheral backward flow 11. The maximum speed of the circulating flow is 5 to 20 times greater than the through-flow speed. Depending on how far the cylindrical vessel 1 extends in the axial direction, the circulating flow is deflected in one or more planes 12. To ensure that the flow distribution remains as rotationally symmetrical as possible, the vessel 1 comprises, above the drawing (not shown), an axial outlet with conical transition to the outlet cross-section. According to the invention, the shear rate of the droplet dispersion produced by the circulatory flow is below 20/s, preferably below 10/s. To estimate the shear rate, twice the inlet speed of the droplet dispersion is divided by half the vessel radius. The inlet pipe 2 for the droplet dispersion projects into the vessel 1 at least by an amount corresponding to the radius of the latter, such that an annular space 7 is formed to the rear of the inlet point, in which annular space 7 the back flow 11 is deflected. As may be seen from the drawing, the nozzles 4 are directed obliquely upwards, such that a peripheral forward flow 13 is initiated in the annular space 7. In this way, on the one hand the back flow 11 in the annular space 7 is divided into an axial and a peripheral forward flow, such that an intensive exchange occurs, and on the other hand additional circulatory flow is generated in the annular space 7, which flow exhibits a greatly reduced droplet concentration owing to the relatively long residence time and the differences in density between the droplets and the continuous phase and dilution by the liquid supplied via nozzles 4. (FIG. 1 represents the situation, where the density of the droplets is smaller than the density of the continous phase).

Figure 2:
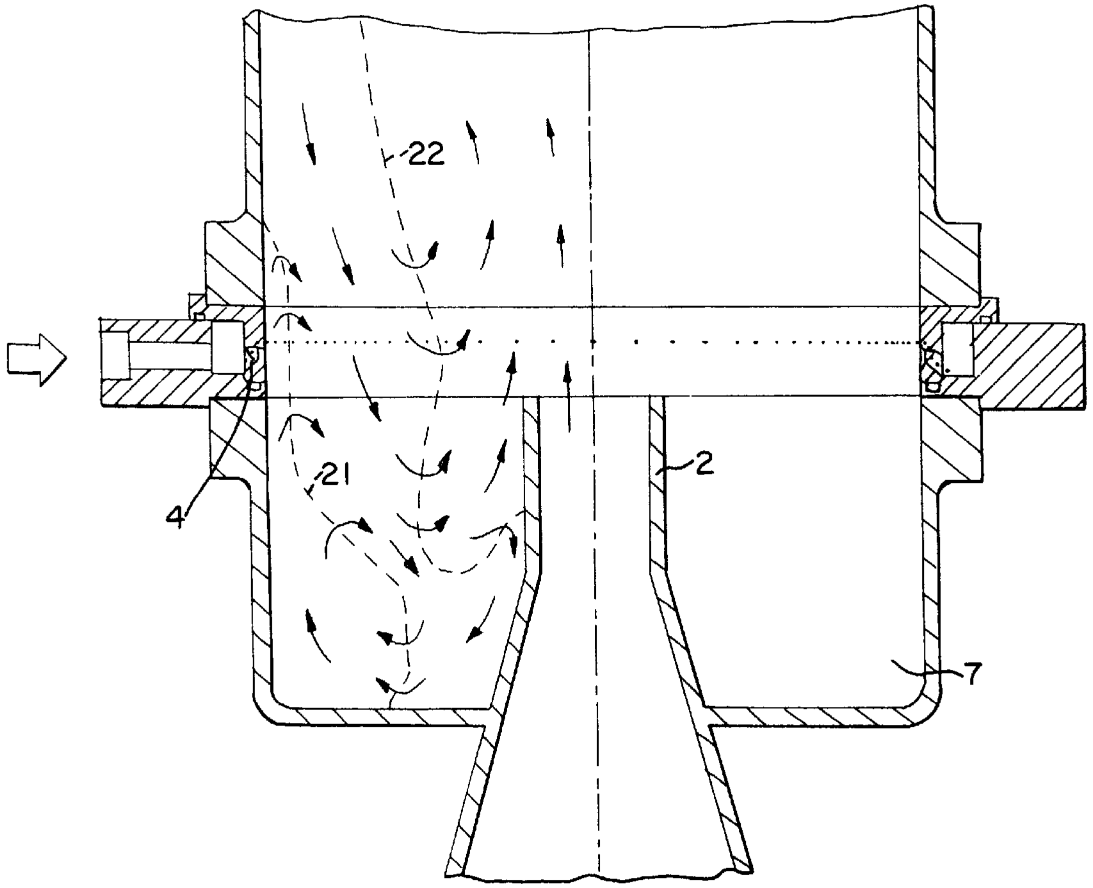
FIG. 2 is an enlarged representation of the area in which the droplet dispersion and the liquid are introduced, with the flow conditions prevailing there.

FIG. 2 is an enlarged representation of the flow conditions in the area of the annular space 7, wherein the broken lines 21 and 22 indicate the boundaries between the flow areas with a forward component on the one hand and a back flow component on the other.

What is claimed is:

1. A device for making microcapsules by continuously mixing a liquid with a droplet dispersion, comprising a cylindrical vessel, having an axis and a vessel wall, with an axially disposed inlet for the droplet dispersion creating an inlet point, said inlet taking the form of an inlet pipe projection into the vessel such that the vessel comprises an annular space surrounding the inlet pipe to the rear of the inlet point, and a plurality of injection nozzles which open in a sectional plane of the vessel wall perpendicular to the axis and, in the through-flow direction, approximately at the level of the inlet point into the vessel, wherein said nozzles and said annular space are sized and oriented such that a droplet dispersion backflow in the annular space is divided into an axial flow and a peripheral forward flow.

2. The device according to claim 1, wherein the diameter of the injection nozzles is about 0.4 mm.

3. The device according to claim 1, wherein the inlet pipe comprises a cross-sectional area of from 1/12 to 1/45 of the cross-sectional area of the vessel.

4. The device according to claim 1, wherein the diameter of the injection nozzles is from about 0.1 mm to about 0.8 mm.

5. The device according to claim 1, wherein the plurality of nozzles comprises at least about 12 nozzles.

6. The device according to claim 5, wherein the plurality of nozzles comprises about 12 to about 120 nozzles.

7. The device according to claim 5, wherein the plurality of nozzles comprises about 120 nozzles.

8. A device for making microcapsules by continuously mixing a liquid with a droplet dispersion, comprising a cylindrical vessel, having an axis and a vessel wall, with an axially disposed inlet for the droplet dispersion creating an inlet point, said inlet taking the form of an inlet pipe projection into the vessel such that the vessel comprises an annular space surrounding the inlet pipe to the rear of the inlet point, and a plurality of nozzles for injecting a liquid into the vessel in the through-flow direction, said nozzles opening in a sectional plane of the vessel wall perpendicular to the axis and approximately at the level of the inlet point, wherein said nozzles and said annular space are sized and oriented such that a droplet dispersion backflow in the annular space is divided into an axial flow and a peripheral forward flow.

9. The device according to claim 8, wherein the diameter of the nozzles is from about 0.1 mm to about 0.8 mm.

10. The device according to claim 9, wherein the diameter of the nozzles is about 0.4 mm.

11. The device according to claim 8, wherein the inlet pipe comprises a cross-sectional area of from 1/12 to 1/45 of the cross-sectional area of the vessel.

12. The device according to claim 8, wherein the plurality of nozzles comprises at least about 12 nozzles.

13. The device according to claim 12, wherein the plurality of nozzles comprises about 12 to about 120 nozzles.

14. The device according to claim 12, wherein the plurality of nozzles comprises about 120 nozzles.

15. A device for making microcapsules comprising a cylindrical vessel containing a liquid and a droplet dispersion, the vessel having an axis and a vessel wall, an annularly disposed inlet for the droplet dispersion creating an inlet point, the inlet taking the form of an inlet pipe projection into the vessel such that the vessel comprises an annular space surrounding the inlet pipe to the rear of the inlet point, and a plurality of nozzles for injecting the liquid into the vessel, the nozzles opening in a sectional plane of the vessel wall perpendicular to the axis and, in the through-flow direction, approximately at the level of the inlet point into the vessel.

* * * * *